United States Patent
Schröder

(10) Patent No.: US 9,132,998 B2
(45) Date of Patent: Sep. 15, 2015

(54) ADJUSTABLE BEARING FOOT

(75) Inventor: Dierk Schröder, Grossenkneten (DE)

(73) Assignee: Manitowoc Crane Group France SAS, Dardilly Cedex (FR)

( * ) Notice: Subject to any disclaimer, the term of this patent is extended or adjusted under 35 U.S.C. 154(b) by 135 days.

(21) Appl. No.: 13/215,860

(22) Filed: Aug. 23, 2011

(65) Prior Publication Data

US 2012/0074292 A1   Mar. 29, 2012

(30) Foreign Application Priority Data

Aug. 24, 2010 (DE) .................... 20 2010 011 720 U

(51) Int. Cl.
| | |
|---|---|
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |
| B66C 23/62 | (2006.01) |
| B66C 23/74 | (2006.01) |
| B66C 23/78 | (2006.01) |
| F16B 39/10 | (2006.01) |

(52) U.S. Cl.
CPC ................ *B66C 23/62* (2013.01); *B66C 23/74* (2013.01); *B66C 23/78* (2013.01); *F16B 39/10* (2013.01)

(58) Field of Classification Search
CPC ......... F16M 7/00; F16M 11/10; D06F 39/125
USPC ................ 248/688, 677, 678, 346.01, 188.8, 248/188.9, 300; 52/122.1, 126.1, 126.3, 52/126.4, 126.5, 126.6, 126.7; 212/292; 16/32

See application file for complete search history.

(56) References Cited

U.S. PATENT DOCUMENTS

| | | | | |
|---|---|---|---|---|
| 1,321,081 | A * | 11/1919 | Behn ............................. | 296/35.1 |
| 2,940,784 | A * | 6/1960 | Fell ............................... | 74/89.35 |
| 3,077,913 | A * | 2/1963 | Bryson .......................... | 411/119 |
| 3,669,393 | A * | 6/1972 | Paine et al. ................. | 248/188.4 |
| 4,096,952 | A * | 6/1978 | Diggs ........................... | 212/176 |
| 4,690,365 | A * | 9/1987 | Miller et al. .................. | 248/650 |
| 5,000,416 | A * | 3/1991 | Fantasia ........................ | 248/650 |
| 5,402,898 | A * | 4/1995 | Lute ................................ | 212/255 |
| 5,511,760 | A * | 4/1996 | Kambara ....................... | 248/650 |
| 6,305,657 | B1 * | 10/2001 | Manpuku et al. ............. | 248/371 |
| 6,547,196 | B2 * | 4/2003 | Binnebose et al. ........... | 248/188 |
| 7,370,769 | B2 * | 5/2008 | Picard et al. .................. | 212/292 |
| 7,487,692 | B2 * | 2/2009 | Lin et al. ..................... | 74/424.86 |
| 2002/0014573 | A1 * | 2/2002 | Anderson ..................... | 248/677 |
| 2008/0157046 | A1 * | 7/2008 | Murphy ......................... | 256/32 |

(Continued)

FOREIGN PATENT DOCUMENTS

| | | |
|---|---|---|
| AU | 759189 B2 | 4/2003 |
| DE | 19856991 A1 | 6/1999 |

(Continued)

*Primary Examiner* — Jonathan Liu
*Assistant Examiner* — Muhammad Ijaz
(74) *Attorney, Agent, or Firm* — John C. Bacoch; Brinks Gilson & Lione

(57) ABSTRACT

An adjustable bearing foot assembly for installation in a base plate, for example a base plate of a crane sub-assembly, including a threaded nut comprising an inner thread; a bearing foot having an outer thread; and a securing element with which the bearing foot can be fixed, rotationally secure, in the threaded nut.

15 Claims, 2 Drawing Sheets

(56) References Cited

U.S. PATENT DOCUMENTS

| | | | |
|---|---|---|---|
| 2009/0206231 A1* | 8/2009 | Firman et al. | 248/677 |
| 2010/0086377 A1* | 4/2010 | de Mola | 411/176 |
| 2011/0076111 A1* | 3/2011 | Suefuji et al. | 411/399 |

FOREIGN PATENT DOCUMENTS

| | | | |
|---|---|---|---|
| DE | 102007041415 A1 | | 3/2008 |
| DE | 69936587 T2 | | 4/2008 |
| EP | 1098094 B1 | | 7/2007 |
| JP | S61-124720 A | | 6/1986 |
| JP | 1995-002560 | | 1/1995 |
| JP | H07-137990 A | | 5/1995 |
| JP | H7-29317 U | | 6/1995 |
| JP | H10-332077 A | | 12/1998 |
| JP | 2003-187312 A | | 7/2003 |
| JP | 2006-242322 A | | 9/2006 |
| KR | 20-0345713 | | 3/2004 |
| KR | 200345713 | * | 3/2004 |
| WO | WO 2009/141862 A | | 11/2009 |

* cited by examiner

ADJUSTABLE BEARING FOOT

FIELD

The present application relates to support mechanisms for crane sub-assemblies.

BACKGROUND

Presently, crane sub-assemblies such as mobile crane counterweight base plates are placed on supports prepared on an undercarriage of the mobile crane. By means of multiple abutments, it is elaborately tried to align the base plates in a position, which allows simple placement of the counterweight plates on the base plate. The multiple abutments are fixedly connected to the undercarriage and cannot be adjusted, for example upon change of the base plate.

SUMMARY

An embodiment of an adjustable bearing foot assembly for installation in a base plate includes a threaded nut comprising an inner thread, a bearing foot comprising an outer thread, and a securing element with which the bearing foot can be fixed, rotationally secure, in the threaded nut.

In another embodiment an adjustable footing support system for crane sub-assemblies includes a base plate with a bore, a threaded nut adapted to be secured in the bore, the threaded nut comprising an inner thread, a bearing foot comprising an outer thread, and a securing element with which the bearing foot can be fixed, rotationally secure, in the threaded nut.

In another embodiment an adjustable footing support system for crane sub-assemblies includes a base plate having a first bore disposed therein and an nut configured to be secured within the first bore, the nut having a first face, a second face spaced apart from the first face, and a second bore with a first inner thread and a first central axis. The adjustable footing support system further includes a bearing foot having a second central axis aligned coaxial the first central axis, a first end and a second end spaced apart from the first end, and a first outer thread between the first end and the second end, the first outer thread intermeshed with the first inner thread of the nut, and a securing element configured to selectively fix a rotation of the bearing foot with respect to the nut.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

The drawings are not necessarily to scale.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Embodiments of the invention are directed to an adjustable footing support for crane sub-assemblies, such as a counterweight base plate. While the embodiments will be described in connection with a counterweight base plate, it will be understood that the embodiments are suitable other crane sub-assemblies.

Figure 1:
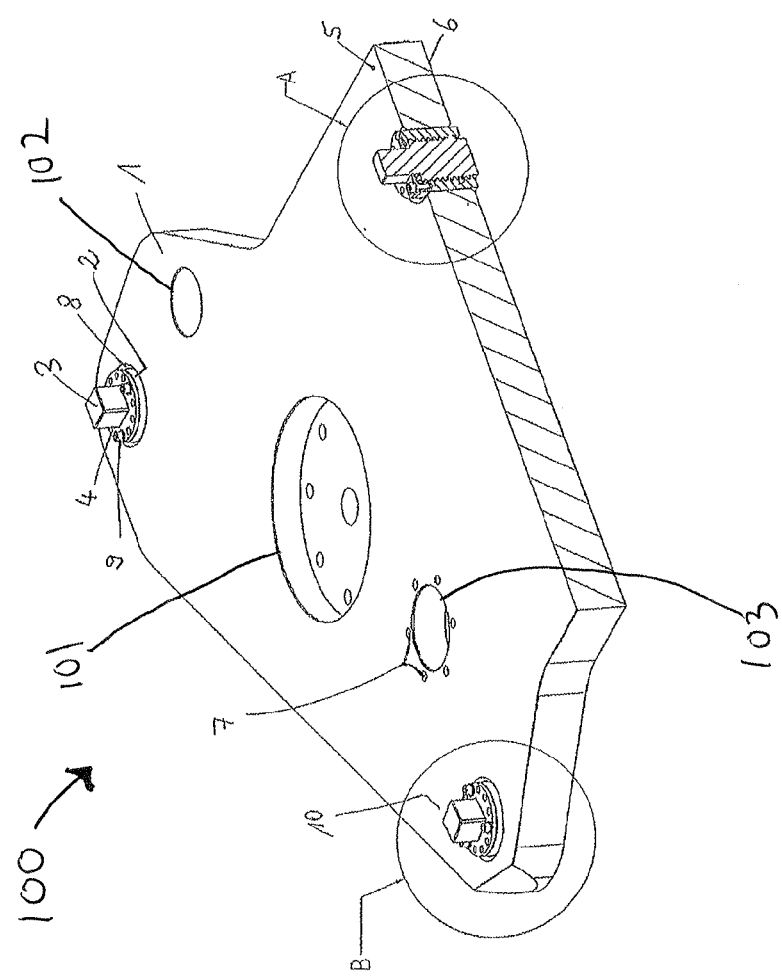
FIG. 1 is a perspective view of a section of a base plate with three bearing foot assemblies.

FIG. 1 illustrates a portion of an adjustable footing support system 100 having a base plate 1 and three bearing feet 3. The base plate 1 includes other bores 101, unrelated to the invention, and therefore not explained in more detail. While FIG. 1 shows only a portion of the base plate 1 with three bearing feet 3, it will be understood that more or less than three bearing feet 3 are possible. The base plate 1 can have any number of bores 8 for the reception of nuts 2. A nut 2 does not have to be seated in every one of the bores 8 and a bearing foot 3 does not have to be threaded into each nut 2. For example, bore 102 and bore 103 do not have bearing feet 3 or nuts 2 disposed therein.

The bores 8 may be formed by a process that removes material such as machining, drilling, milling, etc., or the bores 8 may be formed at the time the base plate 1 is made, such as a casting having the bores 8 present in the mold. The bores 8 of FIG. 1 are through bores that extend from a top face 5 of the base place to a lower face (not shown). In other embodiments, the bores 8 may be blind bores formed in the lower face and not extending to the top face 5. In still other embodiments, the bores 8 may have varying diameters and features such as countersinks.

A nut 2 having a nut bore with an inner thread 21 is secured within each of the bores 8. In other embodiments, a subset of the bores 8 may have nuts 2 secured therein. The nuts 2 may be secured within the baseplate 1 by way of a press fit, welding, gluing, bonding, brazing, or any other type of securing technique as known in the art. Preferably, the nuts 2 are welded into the base plate 1 on one or both front sides. In embodiments where the nuts 2 are press-fitted in the base plate 1, they may be subjected to a cold treatment before press-fitting, such that they expand by warming to ambient temperature in the fitted state, thereby increasing the pressing force in the bore 8. In some embodiments, the nut 2 has an outer thread and the bore 8 has an inner thread. In such embodiments the nut 2 is threaded into the bore 8 and secured in place. In some embodiments the nut may overhang the bore such that a portion of the nut extends beyond the bore.

A bearing foot 3 having an outer thread 31 sized and shaped to thread into the nut bore is threaded into the inner thread 21. At this time, the bearing foot 3 is free to rotate within the nut 2 and the bearing foot's 3 axial position is constrained by the mating of the inner thread 21 and the outer thread 31.

A securing element 4 constrains the rotational movement of the bearing foot 3 relative to the nut 2. When in place, the securing element 4 prevents the bearing foot 3 from being threaded into or out of the nut 2. In combination with the axial constraint provided by the mating threads 21, 31, the bearing foot 3 is effectively secured in place. When the securing element 4 is removed, the bearing foot 3 can again be threaded into or out of the nut 2.

For adjusting or aligning the base plate 1, it can be placed on a supporting surface and be aligned by adjustment of the bearing feet 3 to compensate for any unevenness of the supporting surface and manufacturing tolerances of the base plate 1. Each of the bearing feet 3 can be individually threaded into the nut 2 or be threaded through the nut 2. The length of a portion of the bearing foot 3 protruding beyond the bottom face of the base plate 1 is varied by threading the bearing foot 3 into the nut 2, and the position of the base plate 1 with respect to the supporting surface is correspondingly adjusted. By means of the bearing feet 3, the base plate 1 can thus be aligned.

Once each of the bearing feet 3 are adjusted, they are then be locked in place with the securing element 4, preventing further movement of the bearing feet 3. Thus the positions of the bearing feet 3 are prevented from changing with the time by vibration or other disturbance. The base plate 1 does not have to be continuously readjusted, as the bearing feet 3 are secured in the nuts 2 with securing elements 4 with the base plate 1 aligned.

Figure 2:
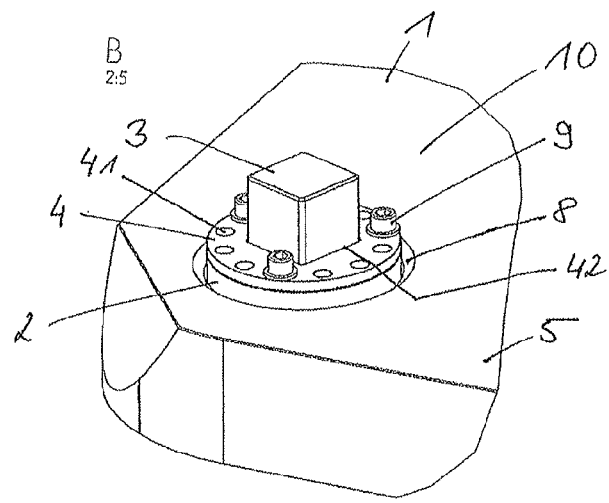
FIG. 2 is a perspective view of an individual bearing foot assembly with a securing element as depicted by circle A of FIG. 1.

FIG. 2 is a close up view of the bearing foot 3 and the securing element 4 of FIG. 1 secured to the baseplate 1. The securing element 4 is a disk having an opening 42 sized and shaped to complement a cross section of the bearing foot 3 extending from the top of the nut 2. The securing element 4 is placed adjacent the nut 2 such that the bearing foot 3 extends through the securing element 4. The bearing foot 3 and the opening 42 together couple the rotation of the securing element 4 and the bearing foot 3.

The securing element 4 has at least one through bore 41, preferably a plurality of through bores 41 arranged annularly about the axis of the securing element 4. The nut 2 has at least one blind bore 22 at the same radial distance as the through bores 41. The blind bore 22 is threaded and sized to receive a screw 9. The screw 9 is inserted through the through bore 41 and threaded into the blind bore 41. With the screw 9 threaded into the blind bore 41, the securing element 41 is constrained from moving relative to the nut 2. More than one blind bore 22 may be present in the nut 2 and preferably the nut 2 has a plurality of blind bores 22 arranged annularly about the axis of the nut 2. The spacing of the through-bores 41 determines how finely the bearing foot 3 can be adjusted.

Due to the cross section of the bearing foot 3 protruding beyond the securing element 4 and the shape of the opening through with the bearing foot 3 extends, the bearing foot 3 can no longer be rotated relative to the nut 2.

In the embodiment of FIG. 2, the nut 2 has three blind bores 22 underneath the securing mechanism 4 at an angular distance of 120° from one another. Accordingly, the bearing foot 3 can only be secured in a position in which the through-bore 41 aligns with a blind bore 22.

Preferably, three blind bores 22 are equidistantly provided on the front side of the nut 2 at an angular distance of 120° between the blind bores 22. However, four through bores 41 with four corresponding blind bores 22 or six through bores 41 with six corresponding blind bores 22 can also be provided with angular distances of 90° and 60°, respectively. Preferably, the securing element 4 has numerous through bores 41 that align with the blind bores 22 in the front side of the nut 2 in each position of the bearing foot 3 and the bearing foot 3 can be connected to the nut 2 in numerous positions.

That is, the more through-bores 41 present in the securing element 4, the finer the bearing foot assembly 10 can be adjusted. However, the spacing of the through-bores 41 cannot be selected arbitrarily small, since there would be the risk that the material between the individual through-bores 41 would yield upon loading. However, the number of the through-bores 41 can be increased if the outer radius of the securing element 4 is increased. If the nut 2 does not protrude beyond the top face 5 of the base plate 1, the securing element 4 can also have an outer diameter, which is larger than an outer diameter of the nut 2. Thus, in another embodiment, the securing element 4 is attached directly to the base plate 1 using through bores 7 annularly arranged on the base plate 1. The larger diameter of the annular arrangement could allow a finer adjustment of the bearing foot 3.

In this case, the blind bores 7, in which the securing element 4 is retained by screws 9 for securing the bearing foot 3, are not formed on the front side of the nut 2, but in the top face 5 of the base plate 1. This prevents the bearing foot 3 from being able to be rotated in the nut 2 if the securing element 4 is threaded onto the base plate 1. A load of the securing element 4 in the rotating direction of the bearing foot 3 is not transmitted to the nut 2 in this embodiment, but is instead received by the base plate 1.

Figure 3:
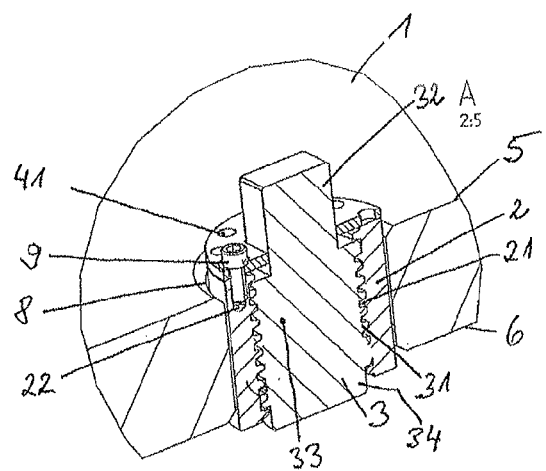
FIG. 3 is sectional view of an individual bearing foot assembly as depicted by circle B of FIG. 1.

In FIG. 3, a cross-section of a footing support 10 is shown. Preferably, the bearing foot 3 is longer than the nut 2. A threaded portion 33 of the bearing foot 3 can correspond to the overall length of the thread of the nut 2. The bearing foot 3 has a first unthreaded portion 32 above the threaded portion 33 and a second unthreaded portion 34 below the threaded portion 33. Thus, the first unthreaded portion 32 and the second unthreaded portion 34 protrude from the top and bottom of the base plate 1, respectively, with the outer thread 31 of the bearing foot 3 completely threaded into the inner thread 21 of the nut 2.

The bearing foot 3 can be threaded by hand, or through the use of a tool. The first unthreaded portion 32 has a cross section that is complementary to a tool. The first unthreaded portion 32 of the bearing foot of FIG. 3 has a cross section that is generally square in shape and is complementary to a tool having a squared recess sized and shaped to match the cross section, such as a square spanner. In other embodiments the cross section may have a different shape such as a triangle, a rectangle, a polygon, a star, etc. Shapes allowing the use of standard tools are therein preferred.

The function of the footing support system 100 can be simply explained. The base plate 1 prepared with the nuts 2 is applied in the field. From the top, the bearing foot 3 can be screwed into the nut 2 until they are flush with the bottom 6 of the base plate, or with nut 2 protruding beyond the bottom 6, flush with the end of the nut 2. Now, the base plate 1 can be adjusted by further screwing the bearing feet 3 into the nut 2 by means of a tool (not shown), thereby lifting the base plate 1. If the base plate 1 is in the desired position, each of the bearing feet 3 is secured by means of a securing element 4 in its adjusted position, wherein very small corrections of individual bearing foot positions can be required to exactly position the through-bores 41 above the threaded bores 22, in order that the screws 9 can be screwed into the threads of the threaded bores 22. Now, the base plate 1 rests on the portions 34 of the bearing feet 3.

What is claimed is:

1. An adjustable bearing foot assembly for installation in a base plate, comprising:
    a threaded nut welded to the base plate, the threaded nut having a through bore with an inner thread and a plurality of blind bores with a blind bore inner thread on a front side of the threaded nut;
    a bearing foot disposed in the through bore, the bearing foot comprising an outer thread threaded into the inner thread and a spanner flat portion of the bearing foot extending from the top of the nut; and
    a securing element separate from the bearing foot and coupled to the threaded nut, the securing element having an opening that is shaped to complement the spanner flat portion of the bearing foot so as to constrain rotation of the bearing foot relative to rotation of the securing element, wherein the securing element circumferentially has through-bores and the securing element is coupled onto the front side of the threaded nut by means of screws.

2. The bearing foot assembly according to claim 1, wherein the bearing foot has a portion including the outer thread and at least one portion without an outer thread.

3. The bearing foot assembly according to claim 2, wherein the at least one portion without an outer thread adjoins the portion including the outer thread.

4. The bearing foot assembly according to claim 2, wherein the securing element is a locking disk disposed about the portion without an outer thread.

5. The bearing foot assembly according to claim 4, wherein the locking disk has an outer diameter that is greater than the outer diameter of the threaded nut.

6. The bearing foot assembly according to claim 3, wherein the portion of the bearing foot without an outer thread protrudes beyond a front side of the threaded nut and beyond the securing element, with the bearing foot secured with the securing element.

7. The bearing foot assembly according to claim 3, wherein the portion of the bearing foot without an outer thread has a cross-sectional shape different from the adjoining portion including the outer thread, and the securing element has a central opening adapted to the shape of the portion without an outer thread.

8. An adjustable footing support system for crane sub-assemblies, comprising:
a base plate with a bore;
a threaded nut welded in the bore to the base plate, the threaded nut having a through inner bore with an inner thread, a plurality of blind bores, each having an inner thread, spaced around the through inner bore, and a spanner flat portion of the bearing foot extending from the top of the nut;
a bearing foot disposed in the inner bore, the bearing foot having an outer thread threaded into the inner thread; and
a securing element separate from the bearing foot and coupled to the threaded nut, the securing element having an opening that is shaped to complement the spanner flat portion of the bearing foot so as to constrain rotation of the bearing foot relative to the securing element and a plurality of circumferentially arranged through-bores, wherein the securing element is coupled to the threaded nut through screws passing through the circumferentially arranged through-bores into the blind holes.

9. The adjustable footing support system according to claim 8, wherein the bore is a through-bore extending from the top of the base plate to the bottom of the base plate.

10. The adjustable footing support system according to claim 8, wherein the securing element circumferentially has through-bores and a front side of the threaded nut has blind bores with an inner thread and the securing element is coupled to the threaded nut by screws passing through the through-bores into the blind bores.

11. The adjustable footing support system according to claim 8, wherein the base plate is a counterweight base plate of a crane.

12. An adjustable footing support system for crane sub-assemblies, the adjustable footing support system comprising:
a base plate having a first bore disposed therein;
a nut welded within the first bore to the base plate, the nut having a first face, a second face spaced apart from the first face, and a second bore with a first inner thread and a first central axis;
a bearing foot having a second central axis aligned coaxial with the first central axis, a first end and a second end spaced apart from the first end, and a first outer thread between the first end and the second end, the first outer thread intermeshed with the first inner thread of the nut, and a spanner flat portion of the bearing foot extending from the top of the nut; and
a securing element separate from the bearing foot, the securing element having an opening that is shaped to complement the spanner flat portion of the bearing foot so as to selectively couple to the nut and constrain rotation of the bearing foot with respect to the securing element and a plurality of circumferentially arranged through-bores, wherein the nut has a plurality of circumferentially arranged bores, each having a second internal thread, and the securing element includes fasteners disposed in the circumferentially arranged through-bores and having a second external thread threadably engaged with the second internal thread.

13. The adjustable footing support system of claim 12, wherein the first bore is a through-bore extending from a top of the base plate to a bottom of the baseplate.

14. The adjustable footing support system of claim 12, wherein the securing element has a plurality of circumferentially arranged through-bores and the nut has a corresponding plurality of circumferentially arranged bores having a second internal thread, and the securing element includes a fastener having a second external thread threadably engaged with the second internal thread.

15. The adjustable footing support system of claim 12, wherein the base plate is a counterweight base plate of a crane.

* * * * *